«United States Patent» [15] 3,692,841
McCloskey et al. [45] Sept. 19, 1972

[54] NONHAZARDOUS POLYMERIZATION INITIATORS

[72] Inventors: Chester M. McCloskey, Altadena, Calif. 91001; Donald E. Rees, Pomona, Calif. 91166; George L. Hoff, Covina, Calif. 91722

[73] Assignee: The Norac Company, Inc., Azusa, Calif.

[22] Filed: June 9, 1969

[21] Appl. No.: 831,729

Related U.S. Application Data

[63] Continuation-in-part of Ser. No. 610,208, Dec. 27, 1966, abandoned.

[52] U.S. Cl. .............................................260/610 R
[51] Int. Cl. ...............................................C07c 73/00
[58] Field of Search.........................260/610 R, 610 B

[56] References Cited

UNITED STATES PATENTS 3,330,871  7/1967  Mageli et al. ..........260/610 R
3,122,417  2/1964  Blaser et al. ...........260/610 R Primary Examiner—Bernard Helfin
Assistant Examiner—W. B. Lone
Attorney—Chester M. McCloskey

[57] ABSTRACT

A nonhazardous ketone peroxide composition is disclosed comprising a ketone peroxide, trischloroethyl phosphate and a glycol.

12 Claims, No Drawings

NONHAZARDOUS POLYMERIZATION INITIATORS

This application is a continuation in part of copending application Ser. No. 610,208 filed Dec. 27, 1966 now abandoned.

This invention relates to a new nonhazardous polymerization initiator composition.

It is an object of this invention to provide essentially non-aqueous ketone peroxide compositions that are stable, of low flamability and nonhazardous for use as a polymerization initiator.

It is another object of this invention to provide a polymerization initiator composition of exceptional activity.

Methyl ethyl ketone peroxide compositions containing sufficient water (often 20 percent or more) to render them of low flamability and nonhazardous are well known in the art. A coupling agent is usually employed to prevent phase separation. Water is very effective in lowering the flamability since its high heat capacity and heat of vaporization provide an energy sink into which the heat of decomposition of the ketone peroxide can be absorbed.

These compositions are employed principally in the low temperature polymerization or curing of unsaturated polyester - vinyl monomer resins commonly known in the art as "polyester resins."

While water (in adequate quantity) is effective in conferring low flamability and nonhazardous properties on ketone peroxide composition, its limited solubility in polyester resins and other vinyl monomers often prevents the ready dispersion or dissolution of the methyl ethyl ketone peroxide composition, resulting in nonuniform polymerization. This is particularly a problem in spray applications employing polyester resins where diffusion of the peroxide composition into the resin droplets is necessary for proper cure, since no physical mixing is involved. The problem is further complicated since ethylene and propylene glycols which have been employed as coupling agents also have a low solubility in the polyester resins.

The hazardous character or organic peroxides in general and ketone peroxides in particular is well known in the art. The lower members of the ketone peroxide family must be diluted with a phlegmetizer or desensitizer before they can be shipped or handled with relative safety. The term "nonhazardous" as used herein encompasses not only the phlegmetization or desensitization to shock and fire such as is provided by dimethyl phthalate to methyl ethyl ketone peroxide, but suppression as well of the acceleration during burning that is characteristic of organic peroxides as well as the rapid or explosive decomposition on heating to high temperatures. The object of the preparation of nonhazardous ketone peroxide compositions is to increase the safety with which such compositions can be shipped, employed and stored so that they can be handled without the special precautions otherwise required. This has become especially important with the introduction of methyl ethyl ketone peroxide into general household use.

The terms "stable" and "stabilizer" unfortunately have double meanings. They are used in some instances to refer to the loss of activity with time. Thus, a peroxide compound that loses less activity (active oxygen) over a specified length of time is said to be more stable. On the other hand "stable" and "stabilizer" are also used to refer to desensitized or phlegmatized compounds. Thus a compound may rapidly lose activity with time but be insensitive to shock and said to be stable. In still another case a compound can be stable in activity, stable to shock yet decompose explosively on heating to high temperatures and be said to be "unstable." Thus the term "nonhazardous" is used herein as described above rather than the word "stable."

It has been discovered in accordance with the present invention that trischloroethyl phosphate although ineffective in conferring nonhazardous properties when used alone with a ketone peroxide is very effective when employed in combination with a glycol and yields a nonhazardous composition of greatly increased solubility in polyester resins as well.

That trischloroethyl phosphate exhibited the same accelerating burning characteristics as dimethyl phthalate when used with a ketone peroxide such as methyl ethyl ketone peroxide as a phlegmetizer was unexpected since phosphates are sometimes added to reduce the flamability of a composition. That a combination of trischloroethyl phosphate and a glycol would be effective was totally unexpected.

It was found that a wide range of glycols could be employed with trischloroethyl phosphate. Ethylene glycol, propylene glycol and their polymers to tetraethylene glycol (mol. wt. 194) were operable. The homologues of ethylene glycol were found to be effective up to and including 2-ethyl-1,3-hexanediol (mol. wt. 146). In both cases the effectiveness of the glycol diminishes as the molecular weight is increased and the ratio for glycol to trischloroethyl phosphate must be increased to be operable.

The term "alkylene glycol" as used herein refers to alkane, cycloalkane and aralkane diols. Thus ethylene glycol, cyclohexane-1,3-diol, 2-ethyl-1,3-hexanediol and 1-phenyl-1,2-ethanediol would all be alkylene glycols and all are effective.

Ketone peroxide compositions, particularly of the lower members usually contain water particularly when glycols are present. Water up to 15 percent can be tolerated, less than 10 percent is desirable and 5 percent or less preferred.

With methyl ethyl ketone peroxide as the model, concentrations of ketone peroxide up to 68 percent (12.5 percent active oxygen) can be safely formulated. However, a 60 percent concentration (11 percent active oxygen) or slightly below is preferred. The ratio by weight of trischloroethyl phosphate to propylene glycol can be varied between 8 to 2 and 1 to 9 but the preferred ratio is 1 to 1. With the higher glycols a ratio between 7.5 to 2.5 and 2.5 to 7.5 is desired. The optimum ratio however depends on the glycol employed.

While the present invention applies to ketone peroxides in general, such as peroxides from methyl amyl ketone, ethyl amyl ketone and methyl iso-butyl ketone, it is particularly useful for the peroxides of the lower molecular weight ketones such as methyl ethyl ketone and methyl propyl ketone. Higher molecular weight ketones (over mol. wt. 128) while operative are not of real importance commercially in the instant compositions since their lower active oxygen concentration greatly reduces their hazard. Methyl ethyl ketone peroxide and its mixtures with cyclohexanone peroxide which are liquids are especially operable. The term ketone peroxide as used here is employed in the sense of common commercial usage. It refers to the hydroxy-hydroperoxy compounds and their functional polymers of commerce. The cyclic trimeric acetone peroxide has no functional hydroxy or hydroperoxy groups and is not commonly employed in free radical initiated polymerization thus the ketones from which operable peroxides are obtained are those encompassed by the aliphatic hydrocarbon monoketones of molecular weight from 72 to 128.

The methyl ethyl ketone peroxide compositions of the instant invention have an exceptionally high activity giving rapid gel with polyester resins and related monomers. These gels are much faster than those of commercial dimethyl phthalate base methyl ethyl ketone peroxides.

The preparation of the ketone peroxide compositions can be carried out by reacting the ketone with hydrogen peroxide in the presence of an acid and a mixture of trischloroethyl phosphate and a glycol, neutralizing and removing the water. The preferred method is to react the ketone and hydrogen peroxide in the presence of an acid and the glycol, neutralize, add the trischloroethyl phosphate and remove the water preferably by distillation. Consistently higher solubilities and lower flamabilities are given by this method. Whether the trischloroethyl phosphate is added before or after the neutralization is unimportant.

The following examples are illustrative only and are not meant to limit the scope of the invention.

EXAMPLE 1

A typical 'unsaturated polyester resin' or polyester resin as they are commonly called used in the following examples was prepared as follows: 65 parts alkyd resin, acid No. 45–50 prepared from 1 mole maleic anhydride, 1 mole phthallc anhydride and 2.2 moles propylene glycol, plus 35 parts styrene, 0.13 parts hydroquinone and 0.03 parts of cobalt as cobalt naphthenate.

EXAMPLE 2

The term PVT test in the examples, refers to a pressure vessel test developed in Holland by Dr. E. W. Lindeljer at the Technological Laboratory of the National Defense Research Organization, and work with it in this country is described by O.T. Mageli et al, Ind. Eng. Chem., 56, 18 (1964). It consists essentially of a pressure vessel into which a sample is placed in a metal cup. On the top is fitted a burst diaphragm calibrated for 100 psi. On the side is a fitting into which discs having varying apertures can be inserted. Using a standard heating rate the smallest aperture that can be tolerated without rupture of the burst diaphragm for a given compound is determined. The smaller the aperture the less hazardous the compound.

EXAMPLE 3

Methyl ethyl ketone peroxide compositions were obtained by reacting 88.5 g. of methyl ethyl ketone and 111 g. of 50 percent hydrogen peroxide in the presence of 0.2 g. of sulfuric acid and 100 g. of phlegmetizer as set forth below at 45°C for 3 ½ hours. The reaction was neutralized with sodium bicarbonate and concentrated under vacuum to an active oxygen concentration of 10.6. The time to gel was determined at 1 percent concentration with the standard polyester resin described in Example 1. The compositions were tested in the bomb described in Example 2 known as the PVT test.

| Phlegmetizer | Gel 25°C time min | PVT Test |
|---|---|---|
| Trischloroethyl phosphate | 18.3 | passes 16mm |
| 75% trischloroethyl phosphate 25% propylene glycol | 13.9 | 6mm |
| 50% trischloroethyl phosphate 50% propylene glycol | 11.9 | 5mm |
| 25% trischloroethyl phosphate 75% propylene glycol | 11.7 | 2mm |
| Propylene glycol | 12.6 | 2mm |

EXAMPLE 4

The solubilities of several methyl ethyl ketone peroxide compositions (active oxygen 10.6 percent) prepared by the method of Example 3 were determined in a polyester resin similar to Example 1 but without the cobalt naphthenate and compared to a commercial nonhazardous methyl ethyl ketone peroxide composition*.

| Phlegmetizer ratio trischloroethyl phosto propylene glycol | ml. required to give haziness to 10 g of resin at 21°C |
|---|---|
| 10/0 | 5.0 |
| 9/1 | 3.4 |
| 5/5 | 1.5 |
| 2.5/7.5 | 0.7 |
| 0/10 | 0.65 |
| Norox W–60* | 0.45 |

*Norox W–60 a product of Norac Co., Inc. of Azusa, California.

EXAMPLE 5

The relative burning characteristics of methyl ethyl ketone peroxide compositions prepared by the method of Example 3 were determined by placing 4 g of the composition in a 30 mm diameter and 30 mm high aluminum foil cup inserting a wick and igniting. The burning time and maximum flame height were determined. In many instances the maximum flame height was reached for only a short period near the end of burning. Active oxygen concentration is 10.6 percent unless noted.

Effect of Phlegmetizer Composition

| Phlegmetizer ratio: trischloroethyl phosphate to propylene glycol | Flame Height Inches | Burning Time Min-Sec |
|---|---|---|
| 10/0 | 29 | 0–28 |
| 8/2 | 24 | 1–20 |
| 7.5/2.5 | 19 | 1–36 |
| 7/3 | 18 | 2–10 |
| 6/4 | 18 | 3–10 |
| 5/5 | 13 | 3–12 |
| 4/6 | 12 | 4–10 |
| 3/7 | 12 | 4–5 |
| 2/8 | 6 | 5–5 |
| 0/10 | 5 | 8–37 |
| Methyl ethyl ketone peroxide in dimethyl phthalate (11% (O) | 30 | 0–20 |
| Ratio: P–600* to propylene glycol | | |
| 10/0 | 31 | 3–0 |
| 5/5 | 27 | 3–0 |

*Polypropylene glycol dibenzoate

Ratio: trischloroethyl phosphate to the following:

| | | | |
|---|---|---|---|
| 1,4-butanediol | 5/5 | 14 | 4–30 |
| 1,3-butanediol | 5/5 | 16 | 4–41 |
| 2-methyl-2,4-pentanediol | 5/5 | 23 | 2–45 |

Effect of Active Oxygen Concentration

| Ratio: trischloroethyl phosphate to propylene glycol | (0)% | | |
|---|---|---|---|
| 10/0 | 12 | 32 | 0–37 |
| 10/0 | 11.6 | 29 | 0–35 |
| 10/0 | 11 | 30 | 0–40 |
| 0/10 | 12 | 5 | 4–40 |
| 0/10 | 11.6 | 4.5 | 4–43 |
| 0/10 | 11 | 4.5 | 6–20 |
| 0/10 | 10.6 | 4 | 9–10 |
| 5/5 | 12.5 | 22 | 1–48 |
| 5/5 | 12 | 19 | 2–17 |
| 5/5 | 11 | 13 | 3–22 |
| 5/5 | 10.6 | 13 | 3–12 |
| 2.5/7.5 | 11 | 4.5 | 5–0 |

Effect of Water Concentration water added %*

| | | | |
|---|---|---|---|
| 5/5 | 0 | 13 | 3–12 |
| 5/5 | 3 | 13 | 3–38 |
| 5/5 | 7.5 | 12 | 4–30 |
| 5/5 | 10 | 12 | 4–0 |

*Water content prior to addition, 6.5%.

EXAMPLE 6

Several methyl ethyl ketone peroxide compositions were prepared by the method of Example 3 utilizing as the phlegmetizer equal portions of trischloroethyl phosphate and one of the glycols listed below. Prepared as well were two compositions containing a mixture of cyclohexanone peroxide and methyl ethyl ketone peroxide with trischloroethyl phosphate and a glycol. Flash point and fire point were determined together with gel time and time to initial cure at 1 percent concentration in the resin of Example 1. The compositions were tested with a 2 mm aperture in the PVT apparatus described in Example 2.

| Glycol Employed | Flash Point C.O.C. °F | Fire Point °F | Gel time mins | Cure Time mins | PVT test Aperture 2mm |
|---|---|---|---|---|---|
| Propylene glycol | 198 | 212 | 9.0 | 87 | passes |
| Dipropylene glycol | 195 | 206 | 15.1 | 98 | passes |
| Diethylene glycol | 196 | 207 | 12.7 | 82 | passes |
| Triethylene glycol | >218 | >218 | 10.3 | 94 | passes |
| Tetraethylene glycol | 211 | >214 | 11.7 | 82 | passes |
| 1,3-butanediol | >215 | >215 | 7.8 | 99 | passes |
| 1,4-butanediol | >215 | >215 | 13.9 | 91.5 | passes |
| 2-methyl-2,4-pentanediol | 195 | 206 | 24.9 | 106.7 | fails (passes 4mm) |

The following compositions contained cyclohexanone peroxide as well as methyl ethyl ketone:

| | | | | | |
|---|---|---|---|---|---|
| Propylene glycol | >220 | >220 | 8.0 | 95 | passes |
| Tetraethylene glycol | >224 | >224 | 14.0 | 82 | fails (passes 4 mm) |
| Methyl ethyl ketone peroxide* in dimethyl phthalate | | 145 | 165 | 45 | 87 | fails (passes 10) |

*A commercial methyl ethyl ketone peroxide composition.

EXAMPLE 7

Several methyl ethyl peroxide compositions were prepared by the method of Example 3 utilizing 1 part of trischloroethyl phosphate to 3 parts of glycol.

| Glycol Employed | PVT Test aperture 2 mm |
|---|---|
| 2-Ethyl-1,3-hexanediol | fails-(passes 4 mm) |
| Hexylene glycol | passes |
| Tetraethylene glycol | passes |
| Tripropylene glycol | fails-(passes 4 mm) |

EXAMPLE 8

A methyl amyl peroxide composition was prepared by the method of Example 3 utilizing equal parts of trischloroethyl phosphate and 2-ethyl-1,3 hexanediol.

PVT test       passes     2 mm.

EXAMPLE 9

A methyl ethyl ketone peroxide composition containing equal parts of trischloroethyl phosphate and propylene glycol and an active oxygen concentration of 10.6 percent was prepared by the method of Example 3 except that the trischloroethyl phosphate was not added until the reaction was completed and the solution neutralized, but before removing the water under vacuum. Its properties were as follows:

| | | |
|---|---|---|
| Accelerated aging 110°F 30 days | 2.5% loss in (0) | |
| PVT test | 2 mm | passes |
| Burning test | 30 mm cup flame height 10 in. | burning time 3 min. 25 sec. |
| Solubility in 10g of resin | 1.8 min. | |
| Gel time 1% conc. Resin of Example 1 25°C | 10.2 min. | |

The above procedure was carried out but the water was removed by salting out with ammonium sulfate.

| | |
|---|---|
| PVT test | passes 2 mm |
| Gel time as above | 13.5 min. |

We claim:

1. A nonhazardous methyl ethyl ketone peroxide composition containing less than 15 percent water, comprising methyl ethyl ketone peroxide, trischloroethyl phosphate, and a glycol selected from the group consisting of dipropylene glycol, a polyethylene glycol of molecular weight not exceeding 194 and an alkylene glycol of molecular weight not exceeding 146.

2. The composition of claim 1 in which the glycol is propylene glycol.

3. The composition of claim 1 in which the glycol is hexylene glycol.

4. A nonhazardous ketone peroxide composition containing less than 15% water comprising a ketone peroxide prepared from an aliphatic hydro-carbon monoketone of molecular weight from 72 to 128 inclusive, trischloroethyl phosphate and a glycol selected from the group consisting of polypropylene, and polyethylene glycols of molecular weight not exceeding 194 and an alkylene glycol of molecular weight not exceeding 146 and the ratio by weight of trischloroethyl phosphate to glycol is between 8 to 2 and 1 to 9, the active oxygen being 12.5 percent or less.

5. A nonhazardous ketone peroxide composition containing less than 15 percent water comprising a ketone peroxide selected from the group consisting of methyl ethyl ketone peroxide and a mixture of methyl ethyl ketone peroxide and cyclohexanone peroxide, trischloroethyl phosphate and a glycol selected from the group consisting of polypropylene, and polyethylene glycols of molecular weight not exceeding 194 and an alkylene glycol of molecular weight not exceeding 146 and the ratio by weight of trischloroethyl phosphate to glycol is between 8 to 2 and 1 to 9, the active oxygen being 12.5 percent or less.

6. The composition of claim 5 in which the glycol is an alkylene glycol of molecular weight not exceeding 146.

7. The composition of claim 6 in which the alkylene glycol is propylene glycol.

8. The composition of claim 7 in which the ratio by weight of trischloroethyl phosphate to propylene glycol is between 7.5 to 2.5 and 2.5 to 7.5.

9. The composition of claim 7 in which the ketone peroxide is methyl ethyl ketone peroxide.

10. The composition of claim 8 in which the ketone peroxide is methyl ethyl ketone peroxide.

11. The composition of claim 6 wherein the glycol is hexylene glycol.

12. The composition of claim 11 wherein the ratio by weight of trischloroethyl phosphate to hexylene glycol is between 7.5 to 2.5 and 2.5 to 7.5.

* * * * *